(12) United States Patent
Jenny

(10) Patent No.: US 9,200,132 B2
(45) Date of Patent: Dec. 1, 2015

(54) PROCESS FOR THE PRODUCTION OF SPRAY POLYURETHANE ELASTOMERS AND THE ELASTOMERS PRODUCED BY THIS PROCESS

(71) Applicant: Bayer MaterialScience LLC, Pittsburgh, PA (US)

(72) Inventor: John W. Jenny, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 9 days.

(21) Appl. No.: 13/836,362

(22) Filed: Mar. 15, 2013

(65) Prior Publication Data

US 2014/0275416 A1  Sep. 18, 2014

(51) Int. Cl.
| | |
|---|---|
| *C08K 3/30* | (2006.01) |
| *C08G 18/48* | (2006.01) |
| *C08G 18/66* | (2006.01) |
| *C08G 18/76* | (2006.01) |
| *C08G 18/79* | (2006.01) |
| *C08G 18/16* | (2006.01) |
| *C08G 18/18* | (2006.01) |
| *C08G 18/24* | (2006.01) |
| *C09D 175/12* | (2006.01) |
| *C08G 18/32* | (2006.01) |
| *C08K 3/26* | (2006.01) |

(52) U.S. Cl.
CPC ............... *C08K 3/30* (2013.01); *C08G 18/163* (2013.01); *C08G 18/1808* (2013.01); *C08G 18/246* (2013.01); *C08G 18/324* (2013.01); *C08G 18/3278* (2013.01); *C08G 18/4816* (2013.01); *C08G 18/4837* (2013.01); *C08G 18/4841* (2013.01); *C08G 18/6685* (2013.01); *C08G 18/7607* (2013.01); *C08G 18/7664* (2013.01); *C08G 18/797* (2013.01); *C08K 3/26* (2013.01); *C09D 175/12* (2013.01); *C08G 2350/00* (2013.01); *C08K 2003/265* (2013.01); *C08K 2003/3045* (2013.01)

(58) Field of Classification Search
USPC .......................................................... 524/423
See application file for complete search history.

(56) References Cited

U.S. PATENT DOCUMENTS

| | | | |
|---|---|---|---|
| 5,104,693 A | 4/1992 | Jenkines | |
| 5,292,778 A * | 3/1994 | Van Veen et al. | 521/126 |
| 5,567,763 A | 10/1996 | Madan et al. | |
| 6,432,543 B2 | 8/2002 | Harrison et al. | |
| 2007/0078253 A1* | 4/2007 | Ulbrich et al. | 528/44 |
| 2011/0059319 A1 | 3/2011 | Raday | |
| 2011/0184079 A1 | 7/2011 | Milliren et al. | |

FOREIGN PATENT DOCUMENTS

WO     2012051135 A1    4/2012

* cited by examiner

*Primary Examiner* — Ling Choi
*Assistant Examiner* — Thuy-Ai Nguyen
(74) *Attorney, Agent, or Firm* — Donald R. Palladino; Robert S. Klemz; Lyndanne M. Whalen

(57) ABSTRACT

Polyurethane elastomers having solids contents greater than 40% by weight are produced from a sprayable polyurethane-forming system composed of an isocyanate component and an isocyanate-reactive component. The isocyanate component has a solids content of from 40 to 80 wt. %, based on total weight of isocyanate component and is made up of at least one aromatic polyisocyanate having an NCO content of from 24 to 33%, a functionality of from 2 to 3 and at least one solid filler. The isocyanate-reactive component has a solids content of from 40 to 80 wt. %, based on total weight of the isocyanate-reactive component and is composed of at least one polyether polyol having a hydroxyl number of from 25 to 40 and a functionality of from 2 to 4, and at least one solid filler.

16 Claims, No Drawings

PROCESS FOR THE PRODUCTION OF SPRAY POLYURETHANE ELASTOMERS AND THE ELASTOMERS PRODUCED BY THIS PROCESS

BACKGROUND OF THE INVENTION

The present invention relates to spray elastomers and a process for preparing these spray elastomers. In the process of the present invention, solid fillers are incorporated into each of the isocyanate and isocyanate-reactive components. This spraying process makes it possible to produce elastomers having higher solids contents than was previously possible. The elastomers produced by the process of the present invention are particularly useful as acoustic components for automotive applications such dashboard insulators and carpet backing.

The inclusion of solids in polyurethane elastomers makes it possible to reduce the cost of such elastomers without sacrificing physical properties of the elastomer. It is therefore commercially desirable to increase the solids content of polyurethane elastomers to the highest possible level.

The amount of solids cannot, however, be increased to a level so high that processing of the polyurethane-forming components becomes too difficult to be commercially viable.

U.S. Pat. No. 6,432,543 discloses a specific sprayable elastomer composition for making components which are particularly suitable for the automotive industry. These components have a molded elastomeric outer layer and an inner polyurethane foam layer. The elastomer is the reaction product of an aromatic polyisocyanate, a solids-containing polyol, a second polyol, and other additives. The total solids content of all components except the polyisocyanate is up to 40 wt. %. Hardness of elastomers containing this amount of solids is generally limited to the range of 70 to 85 Shore A. U.S. Pat. No. 6,432,543 does not, however, teach that the disclosed elastomers could have solids contents greater than 40%.

In currently available polyurethane spray elastomer systems, the solids are incorporated only in the isocyanate-reactive component as is taught in U.S. Pat. No. 6,432,543. Production of elastomers with high solids contents (i.e., solids contents greater than 40%) is, however, limited by this approach because the amount of solid material that can be incorporated into the isocyanate-reactive component cannot be so great that the viscosity of the isocyanate-reactive component is too high for spraying. To achieve higher solids contents, it is therefore necessary to adjust the volume ratio of the isocyanate component being combined with the solids-containing isocyanate-reactive component. The volume ratios (i.e., volume of isocyanate-reactive component to isocyanate component) currently being used in known spray polyurethane elastomer systems generally range from 11:1 to 14:1. Such volume ratios require the use of specialized equipment.

It would therefore be advantageous to develop a spray process for the production of polyurethane elastomers having a solids content greater than 40% that could be conducted using conventional spray equipment.

SUMMARY OF THE INVENTION

It is an object of the present invention to provide spray polyurethane elastomers having solids contents greater than 40% by weight, preferably greater than 50% by weight.

It is another objection of the present invention to provide a spray process for preparing spray polyurethane elastomers having solids contents greater than 40% which may be conducted using conventional spray equipment.

These and other objects which will be apparent to those skilled in the art are accomplished by incorporating filler into both the isocyanate and isocyanate-reactive components of the polyurethane-forming system to be sprayed.

DETAILED DESCRIPTION OF THE INVENTION

The present invention is directed to a polyurethane-forming system for the production of a polyurethane elastomer by spraying having a total solids content of from 40 to 80 wt. %, based on total weight of the polyurethane-forming system. To ensure that the polyurethane-forming system will be sprayable, each of the isocyanate component and the isocyanate-reactive component will generally have a viscosity at 25° C. of less than 4,000 mPa·s, preferably, less than 2,000 mPa·s, most preferably, less than 1,000 mPa·s. The isocyanate component of the polyurethane-forming system may have a solids content of from 40 to 80 wt. % and includes (i) at least one aromatic polyisocyanate having an NCO content of from 24 to 33% and a functionality of from 2 to 3 and (ii) at least one solid filler present in an amount sufficient to obtain an isocyanate component having a solids content of from 40 to 80 wt. %. The isocyanate-reactive component of the polyurethane-forming system of the present invention may have a solids content of from 40 to 80 wt. % and includes (i) at least one polyether polyol having a hydroxyl number of from 25 to 40 and a functionality of from 2 to 4, and (ii) at least one solid filler present in an amount sufficient to obtain a solids content of from 40 to 80 wt. % in the isocyanate-reactive component. The total combined solids contents of the isocyanate and isocyanate-reactive components must, however, be between 40 and 80 wt. %, based on total weight of the polyurethane-forming system.

Suitable polyisocyanates and/or prepolymers thereof useful in the isocyanate component of the present invention must have NCO group contents of from about 24 to about 33%, preferably, from about 28 to about 33%, most preferably, from about 30 to about 32%.

Examples of preferred polyisocyanates and prepolymers thereof include those based on diphenylmethane diisocyanates and polyphenylmethane polyisocyanates having an NCO group content within the required range of from 24 to 33%.

Suitable polyisocyanates typically have a viscosity at 25° C. of at least about 15 mPa·s, more preferably at least about 20 mPa·s and most preferably at least about 23 mPa·s. These polyisocyanates typically have a viscosity of less than or equal to 50 mPa·s, preferably less than or equal to 40 mPa·s and most preferably less than or equal to 35 mPa·s. The polyisocyanate(s) may have a viscosity ranging between any combination of these upper and lower values, inclusive.

Where the isocyanate component includes an isocyanate prepolymer, the isocyanate prepolymer is typically prepared by reacting a suitable polyisocyanate with an isocyanate-reactive material such that the resultant prepolymer has an NCO group content between 24 and 33%. These prepolymers typically have a viscosity at 25° C. of at least about 30 mPa·s, more preferably at least about 35 mPa·s and most preferably at least about 40 mPa·s. These prepolymers typically have a viscosity of less than or equal to 70 mPa·s, preferably less than or equal to 60 mPa·s and most preferably less than or equal to 50 mPa·s. The prepolymer may have a viscosity ranging between any combination of these upper and lower values, inclusive.

Any of the polyisocyanates previously described as being useful as the isocyanate component may be used to produce a prepolymer satisfying the % NCO content and viscosity requirement useful in the practice of the present invention The isocyanate-reactive materials suitable for producing isocyanate prepolymers useful as the isocyanate component of the systems of the present invention include organic compounds containing from 2 to 4, preferably, from 2 to 3, most preferably, about 3 functional groups which are capable of reacting with the isocyanate groups. Suitable isocyanate-reactive groups include OH groups, NH groups, and SH groups with OH groups being particularly preferred.

Suitable molecular weight ranges for these isocyanate-reactive compounds to be used in preparation of the prepolymers are at least about 200, preferably at least about 500, and most preferably at least about 1,000. These compounds also typically have a molecular weight of less than or equal to about 7000 preferably less than or equal to about 6500 and most preferably less than or equal to about 6000. The isocyanate-reactive component may have a molecular weight ranging between any combination of these upper and lower values.

Examples of suitable compounds to be used as the isocyanate-reactive material to be used in preparation of the prepolymers include: polyether polyols, polyester polyols, polycarbonate diols, polyhydric polythioethers, polyacetals, and aliphatic thiols. Polyether polyols are preferred.

A particularly preferred isocyanate to be used as the isocyanate component in the spray system of the present invention is a low-functionality polymeric diphenylmethane diisocyanate (pMDI).

The isocyanate-reactive component of the spray system of the present invention must include at least one polyether polyol having a hydroxyl number of from about 25 to about 40, preferably from about 28 to about 36 and a functionality of from about 2 to about 4, preferably, about 3 and a viscosity at 25° C. of less than 4,000 mPa·s, preferably, less than 2,000 mPa·s, most preferably, less than 1,000 mPa·s.

Isocyanate-reactive materials other than polyether polyols having hydroxyl numbers of from about 25 to about 40 and functionalities of from 2 to 4 may also optionally be included in the isocyanate-reactive component of the systems of the present invention. These optional isocyanate reactive compounds may contain virtually any type of reactive group which is capable of reaction with an NCO group provided that they do not increase the viscosity at 25° C. of the isocyanate-reactive component above 4000 mPa·s.

Polyether polyols suitable for use as isocyanate-reactive component in the present invention may be prepared by any of the techniques known to those skilled in the art. Suitable polyether polyols are commercially available under the names: Hyperlite E-824, Multranol 9111, Multranol 4012, Multranol 4050, and Arcol Polyol LHT-240.

Hydroxyl-containing polyesters may optionally be included in the isocyanate-reactive component of the polyurethane-forming system of the present invention. Suitable hydroxyl-containing polyesters include reaction products of polyhydric alcohols (preferably diols), optionally with the addition of trihydric alcohols, and polybasic (preferably dibasic) carboxylic acids. Suitable polyacetals include compounds obtained from the condensation of glycols, such as diethylene glycol, triethylene glycol, 4,4'-dihydroxydiphenylmethane, and hexanediol, with formaldehyde or by the polymerization of cyclic acetals, such as trioxane.

Other optional isocyanate-reactive materials that may be included in the isocyanate-reactive component of the present invention include: polyether polyols, polyester polyol, polycarbonate diols, polyhydric polythioethers, polyacetals, and aliphatic thiols.

General discussions of representative hydroxyl-containing compounds that may optionally be included in the isocyanate-reactive component of the system of the present invention can be found, for example, in Polyurethanes, Chemistry and Technology by Saunders and Frisch, Interscience Publishers, New York, London, Volume I, 1962, pages 32-42 and pages 44-54, and Volume II, 1964, pages 5-6 and 198-199, and in Kunststoff-Handbuch, Volume VII, Vieweg-Hochtlen, Carl-Hanser-Verlag, Munich, 1966, on pages 45 to 71.

Other suitable additives and auxiliary agents to be included in the isocyanate-reactive component of the present invention include, for example, catalysts, surfactants, chain extenders, crosslinkers, and blowing agents.

A solid filler must be included in each of the isocyanate and isocyanate-reactive components of the polyurethane-forming system of the present invention in an amount between 40 and 80%, preferably, from 45 to 75%, most preferably, from 50 to 70% by weight, based on the component into which that filler is incorporated and the total solids content (due to incorporation of the filler) must be between 40 and 80%, preferably, from 45 to 75%, most preferably, from 50 to 70% by weight, based on the total weight of the polyurethane-forming system.

Suitable solid fillers include: barium sulfate, calcium carbonate, solid microspheres, hollow microspheres, and alumina-hydrate. Barium sulfate is particularly preferred. The particle size of the filler must be such that the reactive component into which it has been dispersed can be sprayed with conventional spraying equipment. Determination of suitable particle sizes is well within the skill of those in the art.

Although the same filler will generally be incorporated into both the isocyanate and isocyanate-reactive components of the polyurethane-forming system of the present invention, it is possible to use a different filler in each of the isocyanate and isocyanate-reactive components.

After the solid filler has been added to the isocyanate and isocyanate-reactive components, those components may be combined in any manner known to those skilled in the art at volume ratios of from 1:4 to 1:1, preferably, from 5:16 to 3:4, most preferably, from 3:8 to 5:8. In the event that there is a delay in combining the filler-containing components, it may be necessary to stir either or both of these components to ensure even distribution of the filler.

After the isocyanate and isocyanate-reactive components in which the solid filler is dispersed are combined, the resultant polyurethane-forming system may be sprayed onto a surface using conventional spray equipment.

The sprayable polyurethane-forming systems of the present invention may be used in any of the known processes for forming composites utilizing conventional spray equipment. U.S. Pat. Nos. 6,294,248, 6,432,543 and 6,649,107, for example, disclose such processes.

The polyurethane elastomers of the present invention are characterized by solids contents of greater than 40% by weight, preferably, from 40 to 80% by weight, and most preferably, from 50 to 70% by weight.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

Examples 1-6

Viscosity Testing

Four different isocyanate components were filled with either barium sulfate or calcium carbonate at levels of 50%, 60% and 70%. The viscosity of each of these filled isocyanate components was then measured immediately after mixing, after 6 hours with 2 minutes of mixing prior to measurement and after 24 hours with 2 minutes of mixing prior to measurement. The measured viscosities are reported in Table 1.

Unacceptably high viscosities are marked with an asterisk (*).

The isocyanates used in this study were as follows:

ISO A: A modified monomeric 4,4'-diphenylmethane diisocyanate having an NCO content of 29.9%, a functionality of and a viscosity at 25° C. of 50 mPa·s which is commercially available from Bayer MaterialScience LLC under the name Mondur CD.

ISO B: Diphenylmethane diisocyanate having an NCO content of 32.5%, a functionality of 2.3 and a viscosity at 25° C. of 29 mPa·s which is commercially available from Bayer MaterialScience under the name of Mondur 1488.

ISO C: A mixture of 50 parts ISO A and 50 parts ISO B having an NCO content of 31.2%, a functionality of 2.24 and a viscosity at 25° C. of 40 mPa·s.

ISO D. A polymeric diphenylmethane diisocyanate having an NCO content of 31.5%, a functionality of 2.8 and a viscosity at 25° C. of 200 mPa·s which is commercially available from Bayer MaterialScience LLC under the name Mondur MR.

TABLE 1

| Example/Filler | ISO/% Filler | Time | Temperature (° C.) | Viscosity (mPa · s) |
|---|---|---|---|---|
| 1/BaSO$_4$ | A/50% | 0 | 22.1 | 108 |
| | A/60% | 0 | 23.7 | 293.9 |
| | A/70% | 0 | 26.5 | 1092 |
| | A/50% | 6 hr | 22.1 | 389.9 |
| | A/60% | 6 hr. | 22.5 | 1548 |
| | A/70% | 6 hr | 23.2 | 11,362* |
| | A/50% | 2 days | 22.3 | 1044 |
| | A/60% | 2 days | 23.3 | 2387 |
| | A/70% | 2 days | 24.1 | 16466* |
| 2/BaSO$_4$ | B/50% | 0 | 25 | 156 |
| | B/60% | 0 | 24.8 | 305.9 |
| | B/70% | 0 | 28.4 | 1818 |
| | B/50% | 6 hr. | 21.2 | 234 |
| | B/60% | 6 hr. | 21.4 | 888 |
| | B/70% | 6 hr. | 22.5 | 58384* |
| | B/50% | 2 days | 21.7 | 359.9 |
| | B/60% | 2 days | 22.8 | 2190 |
| | B/70% | 2 days | 23.8 | Max* |
| 3/BaSO$_4$ | C/60% | 0 | 23.4 | 395.9 |
| | C/60% | 6 hr. | 22.5 | 653.9 |
| | C/60% | 2 days | 23.8 | 2657 |
| 4/CaCO$_3$ | D/50% | 0 | 29.8 | 1512 |
| | D/60% | 0 | 34.5 | 6020* |
| | D/70% | 0 | 47.5 | 76,184* |
| | D/50% | 6 hr. | 26.6 | 3155 |
| | D/60% | 6 hr. | 26.7 | 270,000* |
| | D/50% | 2 days | 25.3 | 63,811* |

Examples 5-6

Preparation of Spray Elastomer

The following materials were included in the isocyanate-reactive component used to produce spray elastomers having a solids content greater than 40% in accordance with the present invention:

POLYOL A: A polyol having a hydroxyl number of 36 mg KOH/g and a functionality of approximately 3 which is commercially available from Bayer MaterialScience LLC under the name Hyperlite E-824.

POLYOL B: A polypropylene oxide-based triol having a hydroxyl number of 370 mg KOH/g which is commercially available from Bayer MaterialScience LLC under the name Multranol 4012.

POLYOL C: A polypropylene oxide-based triol having a hydroxyl number of 238 mg KOH/g which is commercially available from Bayer MaterialScience LLC under the name Arcol Polyol LHT-240.

POLYOL D: A polypropylene oxide-based diol specially modified with ethylene oxide having a hydroxyl number of 28 mg KOH/g which is commercially available from Bayer MaterialScience LLC under the name Multranol 9111

POLYOL E: An amine based tetrafunctional polyether polyol having a hydroxyl number of 9112 mg KOH/g which is commercially available from Bayer MaterialScience LLC under the name Multranol 4050

Pigment: A carbon black pigment containing colorant known as Colormatch DR-0217 (black)

Baytec 505 Diethyltoluenediamine (DETDA), an aromatic diamine, which is commercially available from Bayer MaterialScience LLC under the name Baytec 505.

Dabco T-12 A high-boiling organo-tin compound (dibutyltindilaurate) used as a polyurethane catalyst and is available from Air Products and Chemicals, Inc.

Dytek A A methyl branched, 5-carbon chain diamine (2-methylpentamethylenediamine) which is available from Invista.

Filler 1: Barium sulfate added to the isocyanate-reactive component.

Filler 2: Barium sulfate added to the isocyanate component.

The materials used to produce the isocyanate-reactive component were combined in the amounts listed in Table 2. 166 grams of barium sulfate were then added to the isocyanate-reactive component to obtain an isocyanate-reactive component having a solids content of 60%.

Then 83 grams of barium sulfate were added to the isocyanate listed in Table 2 to obtain an isocyanate component having a solids content of 60%.

The isocyanate and isocyanate-reactive components were then combined in a ratio by volume equivalent to of 1:2 (isocyanate:isocyanate-reactive components). The isocyanate-reactive component was made up of POLYOL A, POLYOL B, POLYOL C, POLYOL D or POLYOL E, Pigment, Baytec 505, Dabco T-12, Dytek A and Filler 1. The isocyanate component was composed of ISO B or ISO C and Filler 2.

The total solids content of the polyurethane-forming system formed by combining the isocyanate and isocyanate-reactive components and the viscosity of each of the components of the polyurethane-forming system are reported in Table 2. This polyurethane-forming system was then sprayed onto a heated aluminum surface to generate test samples.

TABLE 2

| Example | 5 | 6 |
| --- | --- | --- |
| POLYOL A (pbw) | 33.3 | 38.3 |
| POLYOL B (pbw) | 10 | 10 |
| POLYOL C (pbw) | 40 | 40 |
| POLYOL D (pbw) | 10 | — |
| POLYOL E (pbw) | — | 5.0 |
| Pigment (pbw) | 1.0 | 1.0 |
| Baytec 505 (pbw) | 5.0 | 5.0 |
| Dabco T-12 (pbw) | 0.2 | 0.2 |
| Dytek A (pbw) | 0.5 | 0.5 |
| Filler 1 (pbw) | 60 | 60 |
| ISO B (pbw) | 50 | — |
| ISO C (pbw) | — | 50 |
| Filler 2 | 60 | 60 |
| Total Solids Content (% by weight) | 60 | 60 |
| Viscosity at 25° C. of isocyanate-reactive component (mPa · s) | 1150 | 1200 |
| Viscosity at 25° C. of isocyanate component (mPa · s) | 890 | 655 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane-forming composition suitable for the production of a polyurethane elastomer by spraying comprising:
    a) an isocyanate component having a solids content of from 40 to 80 wt. %, based on total weight of isocyanate component and a viscosity at 25° C of less than 4,000 mPa.s comprising:
        (i) at least one aromatic polyisocyanate having an NCO content of from 24 to 33%, a functionality of from 2 to 3 and
        (ii) at least one solid filler present in an amount sufficient to obtain the solids content of a)
    and
    b) an isocyanate-reactive component having a solids content of from 40 to 80 wt. %, based on total weight of the isocyanate-reactive component and a viscosity at 25° C of less than 4,000 mPa.s comprising:
        (i) at least one polyether polyol having a hydroxyl number of from 25 to 40 and a functionality of from 2 to 4, and
        (ii) at least one solid filler present in an amount sufficient to obtain the solids content of b)
    wherein the total solids contents of a) plus b) is from 40 to 80 wt. %, based on total weight of the polyurethane-forming system.

2. The composition of claim 1 in which the polyisocyanate is a polymeric MDI, a modified MDI or a mixture thereof.

3. The composition of claim 1 in which the solid filler for each of components a) and h) is selected from barium sulfate and calciuria carbonate.

4. The composition of claim 1 in which the same filler is used in each of components a) and b).

5. The composition of claim 4 in which the filler is barium sulfate.

6. The composition of claim 1 in which the solid filler is present in the isocyanate component in an amount of from 50 to 70% by weight.

7. The composition of claim 1 in which the solid filler is present in the isocyanate reactive component in an amount of from 50 to 70% by weight.

8. The composition of claim 1 in which the total solids content is from 50 to 70% by weight.

9. The composition of claim 1 in which the viscosity of each of the isocyanate component and the isocyanate-reactive component is less than 3000 mPa.s.

10. The composition of claim 1 in which the isocyanate and the isocyanate-reactive components are reacted in an NCO/OH ratio of from 60 to 160.

11. The composition of claim 1 in which component b) further includes an amine-based polyether polyol having a hydroxyl number of from 600 to 660 mg KOH/g.

12. The composition of claim 1 in which component b) further includes a propylene oxide-based triol having a hydroxyl number of from 220 to 260 mg KOH/g.

13. The composition of claim 12 in which component b) further includes an amine-based polyether polyol having a hydroxyl number of from 600 to 660 mg KOH/g.

14. An elastomer produced by spraying the polyurethane-forming composition of claim 1.

15. An elastomer produced by spraying the polyurethane-forming composition of claim 5.

16. A process for the production of a polyurethane elastomer comprising spraying the composition of claim 1.

* * * * *